Aug. 10, 1971     H. HARNISCH ET AL     3,598,525
PROCESS FOR THE MANUFACTURE OF $P_2O_5$ AND POLYPHOSPHORIC ACID
Filed Oct. 21, 1968
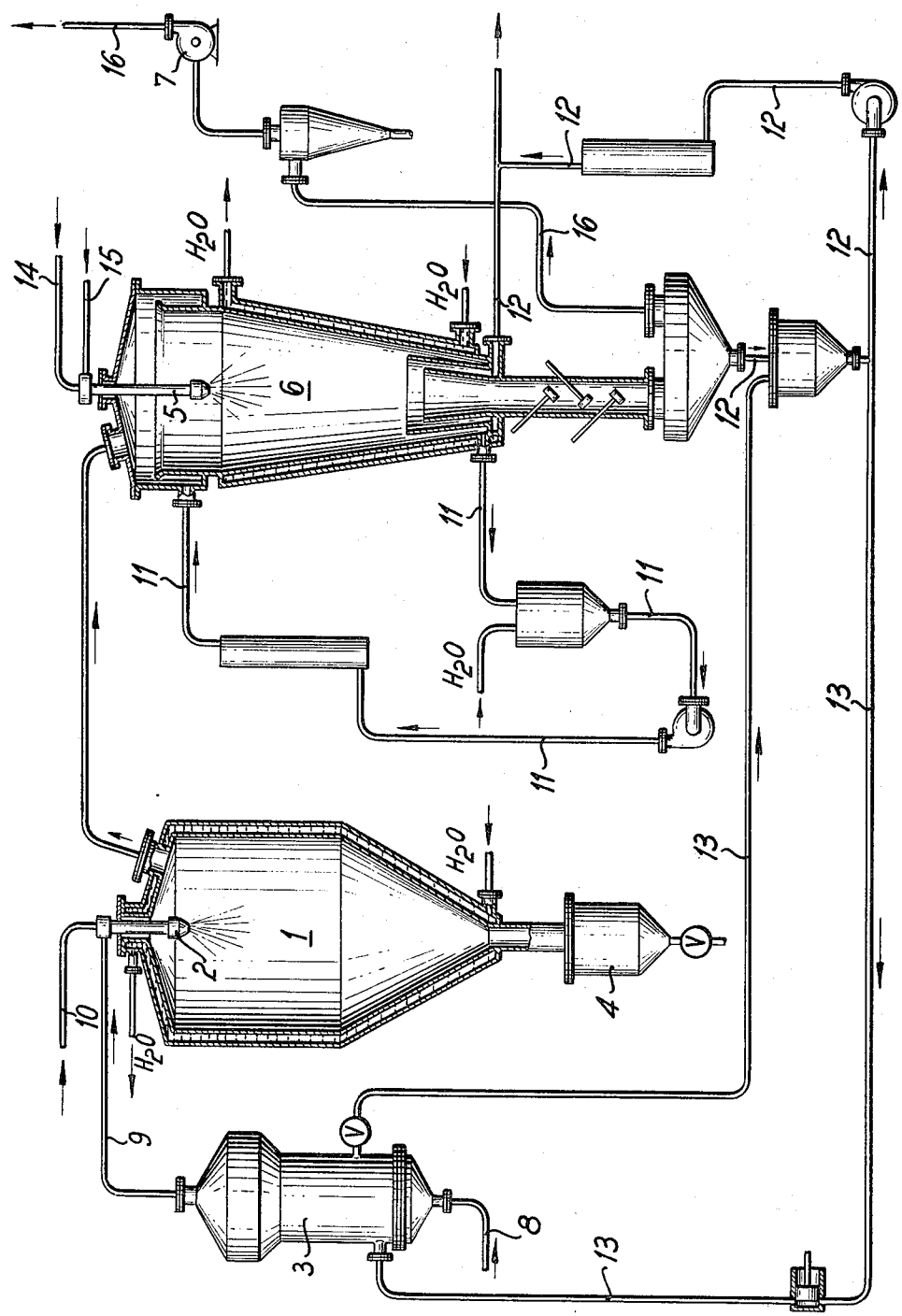

United States Patent Office 3,598,525
Patented Aug. 10, 1971

3,598,525
PROCESS FOR THE MANUFACTURE OF $P_2O_5$
AND POLYPHOSPHORIC ACID
Heinz Harnisch, Lovenich, near Cologne, Fritz Krahl and Friedrich Thomas, Hermulheim, near Cologne, and Herbert Panter, Alstadten, near Cologne, Germany, assignors to Knapsack Aktiengesellschaft, Cologne, Germany
Filed Oct. 21, 1968, Ser. No. 679,298
Claims priority, application Germany, Nov. 30, 1967, P 16 67 577.7
Int. Cl. C01b 25/20, 25/24
U.S. Cl. 23—165   7 Claims

ABSTRACT OF THE DISCLOSURE

Solid $P_2O_5$ and polyphosphoric acid are produced simultaneously by burning, in the upper portion of a first reaction zone whose walls are cooled down to temperature lower than 150° C., molten elementary phosphorus with a molecular oxygen-containing gas; condensing a portion of resulting gaseous $P_2O_5$ in the reaction zone and transforming it into solid $P_2O_5$; discharging the solid $P_2O_5$ from the base portion of the reaction zone; supplying gas containing unseparated $P_2O_5$ and issuing from the said reaction zone to a second reaction zone; producing polyphosphoric acid in the second reaction zone by cycling therein polyphosphoric acid with a $P_2O_5$-content lower than that desired for the polyphosphoric acid to be produced as the final product; and absorbing in the cycled polyphosphoric acid the $P_2O_5$ contained in the gas issuing from the first reaction zone.

---

The present invention relates to a process for the manufacture or phosphoric anhydride by combustion of elementary phosphorus and condensation of resulting vaporous $P_2O_5$, and relates to the production of polyphosphoric acid by $P_2O_5$-absorption in polyphosphoric acid which has a $P_2O_5$-content lower than that desired for the final product.

Phosphoric anhydride is known to exist in several solid modifications. The object of the present process is to produce hexagonal phosphoric anhydride (also termed phase-H or phase-M) which unlike the polymeric modifications is formed of $P_4O_{10}$-molecules and is termed hereinafter phosphoric anhydride without special reference to its modification.

The large-scale oxidation of yellow phosphorus, for example, by means of air into phosphoric acid entails the formation of a gas mixture which contains $P_2O_5$ and in addition residual gas originating from combustion air as well as the excess of air necessary to achieve complete combustion. Depending on the temperature of the reaction mixture, $P_2O_5$ is obtained either in gas form or in the form of a dispersion of fine solid particles in the combustion gas. The recovery of solid, absolutely dry $P_2O_5$ in good yields from such gas mixture by condensation is an extremely difficult procedure.

Various phosphoric anhydride production processes have already been described. A customary commercial process comprises passing a $P_2O_5$-containing combustion mixture over cold areas and depositing phosphoric anhydride thereon. It is also known that the combustion gas can be passed through large towers, so-called silos. On travelling therethrough, the gas mixture becomes cooled and solid $P_2O_5$-particles are found to form, which gradually grow so as to finally precipitate as a fine particulate material. These processes have considerable disadvantages, which include poor heat transfer, defective process control, large-dimensioned facilities, and accordingly high costs. As uncondensable combustion gas is normally allowed to escape into the atmosphere, it is generally necessary to provide for large sedimentation volumes and additional complicated facilities for separation of condensed $P_2O_5$. The strict rules of the air pollution Act call for this. But even if this is done, it is generally impossible to obtain more than 90% of the final product in solid, finely divided form. A further factor to consider is the formation of crusts in the condensation zones which often entail repeated stoppage of the production facilities.

In a more recent process, a fluidized bed of $P_2O_5$-particles is used to condense the phosphoric anhydride present in the gas mixture, obtained by phosphorus combustion. The condensed $P_2O_5$ is obtained in the form of spherical agglomerates which can be evacuated continuously. The fluidized bed is maintained at a temperature lower than the condensation temperature of $P_2O_5$ by cooling and by means of a dry gas cycle.

While the above process as compared with earlier methods describes a step forward in the art, the fact remains that the resulting product has a reactivity substantially lower than that of hexagonal $P_2O_5$, such as that obtained by these earlier methods. Furthermore, rather considerable expenditure in respect of apparatus is incurred despite the use of small-dimensioned production facilities. This is more particularly occasioned by the need to use facilities which enable cycled fluidizing gas to be freed from entrained $P_2O_5$-particles. The production of polymeric phosphoric anhydride has also been described in patent literature, in addition to the processes referred to above.

Further processes for the production of polyphosphoric acid have been described in German Pats. 1,111,159 and 1,159,403, wherein phosphoric anhydride produced by burning elementary phosphorus is absorbed in polyphosphoric acid which has a $P_2O_5$-content lower than that desired for the final product and is conveyed through either one cycle or two separate cycles.

The object of the present invention is to provide a process for the simultaneous, continuous production of hydroscopic, hexagonl phosphoric anhydride (in a substantially dry atmosphere) and polyphosphoric acid.

The present process for the simultaneous production of solid $P_2O_5$ and polyphosphoric acid comprises more particularly burning, in the upper portion of a first reaction zone, whose walls are cooled down to temperatures lower than 150° C., molten, elementary phosphorus with a molecular oxygen-containing gas, for example, with the help of a nozzle; condensing a portion of resulting gaseous $P_2O_5$ in the said reaction zone and transforming it into solid $P_2O_5$; discharging the solid $P_2O_5$ from the base portion of said reaction zone; supplying gas containing unseparated $P_2O_5$ and issuing from the first reaction zone to a second reaction zone; producing polyphosphoric acid in said second reaction zone by cycling therein polyphosphoric acid with a $P_2O_5$-content lower than that desired for the polyphosphoric acid to be produced as the final product; and absorbing in the cycled polyphoshoric acid the $P_2O_5$ contained in the gas issuing from the first reaction zone.

The walls of the first reaction zone are preferably cooled down to a temperature lower than 100° C. Predried gas should advantageously be used for burning the phosphorus. The gas can more particularly be pre-dried by passing it through polyphosphoric acid with a preferred $P_2O_5$-content between 81 and 84% by weight. The polyphosphoric acid used as the drying agent can be derived from the polyphosphoric acid cycled in the second reaction zone, and recycled later to the second reaction zone. The phosphorus combustion in the first reaction zone is most preferably carried out so as to produce a temperature between 300 and 450° C., preferably 350 and 450° C., for the gas issuing from that zone.

Given that the production of polyphosphoric acid in a quantity larger than that obtainable from the $P_2O_5$ in the gas issuing from the first reaction zone is contemplated, it is possible, in the second polyphosphoric acid-production zone, to burn additional phosphorus by means of a molecular oxygen-containing gas and transform it into phosphoric anhydride.

The present process thus obviates the difficult complete separation of dry, fine and particulate $P_2O_5$ as well as the considerable expenditure in respect of apparatus, which is associated therewith. This means an advantage for the present process which resides more particularly in the use of specific, small-dimensioned apparatus. These are uncomplicated and therefore unsusceptible to disturbances.

Unlike the present process, those described earlier do not separate the phosphoric anhydride in the phosphorus combustion zone itself. This is occasioned firstly by the fact that practically complete $P_2O_5$-separation cannot be produced in the combustion zone, which means that the omission of separate condensers is impossible without recovery of residual $P_2O_5$ from the issuing gas in the form of a different product, as in the present case. Secondly, the incomplete combustion of small, not entirely oxidized phosphorus particles, which become partially quenched on the cooled surfaces of the combustion zone, would have been expected to result in the formation of suboxides. Despite this, it has unexpectedly been found that suboxide-free product can be precipitated on the cooled inside walls of the relatively small combustion chamber.

The product obtained by the present process has a reactivity which corresponds to that of rapidly reacting hexagonal phosphoric anhydride. Its bulk density is between 700 and 750 grams per liter and more than 95% of its particles have a size of less than 200 microns. Its content of lower oxides, calculated as $P_2O_3$, is less than 0.03%.

As already mentioned above, the present process combines the production of phosphoric anhydride with the simultaneous production of polyphosphoric acid, such as that described in German Pats. 1,111,159 or 1,159,403. This enables substantially steam-free air, which is needed for the phosphorus combustion, to be obtained by drying normal outside air by means of polyphosphoric acid, omitting the actually customary drying with the use of sulfuric acid or silica gel. Further advantages and details of the present process are described hereinafter with reference to the accompanying flow scheme.

Compressed air is fed through line 8 to a drying tower 3 and conveyed therein, for example, with the aid of a sinter metal tray, in finely divided form through hot polyphosphoric acid of 84% strength. The phosphorus combustion nozzle 2 is fed with dry air travelling through line 9 and with liquid yellow phosphorus flowing through line 10. In nozzle 2, the phosphorus is finely atomized and burnt into phosphoric anhydride by means of the air, which is used in an excess of 20 to 50% by weight, based on $P_2O_5$. The resulting phosphoric anhydride is found partially to condense on the water-cooled walls of combustion chamber 1. Unlike in conventional processes, the phosphorus oxidation into gaseous $P_2O_5$ and its condensation do not occur in separate facilities, but are produced by a single process step in the combustion chamber which simultaneously serves as a condenser. Fairly complete separation of solid phosphoric anhydride is intentionally omitted for reasons already described above. Phosphoric anhydride, which condenses on the cooled tower walls, continuously falls downwardly as a loose dry material, unexpectedly without leaving traces of incrustation or caking on the walls of the combustion chamber, and is finally delivered through a lock to a container 4. This means very good heat exchange between the turbulent reaction gas flow and the water-cooled tower walls, which preferably consist of metal. Partially gaseous and partially condensed phosphoric anhydride conveyed together with issuing gas to the second reaction tower 6 is transformed in conventional manner, in a two cycle system, into polyphosphoric acid, for example in the manner described in German Pat. 1,159,403. The acid is maintained at a constant $P_2O_5$-content of 76% in cycle I (11) by the introduction of water and concentrated further to 84% $P_2O_5$ in cycle II. Polyphosphoric acid needed to dry the necessary combustion air is placed in drying tower 3. It is continuously regenerated by repumping a partial polyphosphoric acid stream 13, that is preferably derived from cycle II.

The process of the present invention can be modified in various ways. For example, it is possible to provide merely one phosphorus combustion nozzle in reaction chamber 1 for the production and separation of phosphoric anhydride, and to use merely the $P_2O_5$-content in the gas evacuated from reactor 1 for the following production of polyphosphoric acid. In order to avoid too narrow a combination of these two production steps, a second phosphorus combustion nozzle 5 with a phosphorus feed line 14 and an air feed line 15 should be conveniently arranged in polyphosphoric production tower 6, the two combustion nozzles 2 and 5 being arranged for individual and joint operation.

EXAMPLE

The two phosphorus combustion nozzles 2 and 5 were successively set to work. Each nozzle was fed per hour with 35 liters phosphorus (or 60 kg./hr.) and with a 40% by weight excess of air, based on $P_2O_5$, once acid cycles I and II, partial stream 13, the wall-cooling system of combustion tower 1 and issuing gas blower 1 had been set to work. The issuing gas stream 16 was regulated by means of the issuing gas blower so as to produce a pressure between atmospheric and slight subpressure in the $P_2O_5$ production tower 1. After 4 hours of operation, 240 kg. $P_2O_5$ or 43.6% of the theoretical quantity were found to have separated. The $P_2O_5$-proportion conveyed together with the issuing gas to the polyphosphoric production zone was transformed together with the phosphoric anhydride produced in reaction tower 6 into polyphosphoric acid containing 84% $P_2O_5$. After a short while, the gas issuing from combustion tower 1 was found to have an approximately constant temperature between 380 and 410° C.

$P_2O_5$ and polyphosphoric acid were obtained in a total yield of 99% by weight, based on the phosphorus used.

We claim:

1. A process for the simultaneous production of solid phosphoric anhydride and polyphosphoric acid which comprises
   (a) burning, in the upper portion of a first reaction zone whose walls are cooled down to temperatures lower than 150° C., molten elementary phosphorus with a molecular oxygen-containing gas;
   (b) condensing a portion of resulting gaseous $P_2O_5$ in said reaction zone and transforming it into solid $P_2O_5$;
   (c) regulating the phosphorus combustion in the first reaction zone so as to produce a temperature between 300 and 450° C. for the gas issuing from the said first reaction zone;
   (d) discharging the said solid $P_2O_5$ from the base portion of the said reaction zone;
   (e) supplying gas containing unseparated $P_2O_5$ and issuing from the said reaction zone to a second reaction zone;
   (f) producing polyphosphoric acid in said second reaction zone by cycling therein polyphosphoric acid with a $P_2O_5$-content lower than that desired for the polyphosphoric acid to be produced as the final product; and (g) absorbing in the said cycled polyphosphoric acid the $P_2O_5$ contained in the gas issuing from the first reaction zone.

2. The process of claim 1, which comprises cooling the walls of the first reaction zone down to temperatures lower than 100° C.

3. The process of claim 1, which comprises drying the phosphorus combustion gas by passing it through polyphosphoric acid.

4. The process of claim 3, which comprises deriving the polyphosphoric acid used for the drying step from a polyphosphoric acid cycle in the second reaction zone and recycling the derived polyphosphoric acid later to the second reaction zone.

5. The process of claim 1, wherein the gas issuing from the first reaction zone has a temperature between 350 and 450° C.

6. The process of claim 1, which comprises burning an additional quantity of phosphorus with a molecular oxygen-containing gas to obtain phosphoric anhydride, the burning step being carried out in the second polyphosphoric acid production zone.

7. The process of claim 3, which comprises using polyphosphoric acid with a $P_2O_5$-content between 81 and 84% by weight.

References Cited

UNITED STATES PATENTS

| | | | |
|---|---|---|---|
| 1,700,708 | 1/1929 | Pistor et al. | 23—165 |
| 3,193,350 | 7/1965 | Beltz et al. | 23—165 |

OTHER REFERENCES

M. M. Striplin and J. H. Walthall: Industrial and Engineering Chemistry, August 1942, vol. 33, No. 8, 995–1000.

Van Wazer: Phosphorus and Its Compounds, vol. II, 1961, 1200–1202.

OSCAR R. VERTIZ, Primary Examiner

G. A. HELLER, Assistant Examiner